United States Patent
O'Malley et al.

(10) Patent No.: US 11,626,110 B2
(45) Date of Patent: *Apr. 11, 2023

(54) PREVENTING UNWANTED ACTIVATION OF A DEVICE

(71) Applicant: Comcast Cable Communications, LLC, Philadelphia, PA (US)

(72) Inventors: Shawn O'Malley, Glenside, PA (US); Michael Rosenwald, Pottstown, PA (US); Jeremy Zaucha, West Chester, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/249,747

(22) Filed: Mar. 11, 2021

(65) Prior Publication Data

US 2021/0272561 A1 Sep. 2, 2021

Related U.S. Application Data

(63) Continuation of application No. 16/182,126, filed on Nov. 6, 2018, now Pat. No. 10,978,057, which is a continuation of application No. 15/798,625, filed on Oct. 31, 2017, now Pat. No. 10,152,966.

(51) Int. Cl.
| | |
|---|---|
| *G10L 15/20* | (2006.01) |
| *G10L 15/22* | (2006.01) |
| *H04N 21/422* | (2011.01) |
| *H04M 1/72484* | (2021.01) |
| *G06F 3/16* | (2006.01) |
| *G10L 19/018* | (2013.01) |

(52) U.S. Cl.
CPC .............. *G10L 15/20* (2013.01); *G10L 15/22* (2013.01); *H04M 1/72484* (2021.01); *H04N 21/42203* (2013.01); *G06F 3/167* (2013.01); *G10L 19/018* (2013.01); *G10L 2015/223* (2013.01); *G10L 2015/228* (2013.01); *H04M 2250/74* (2013.01)

(58) Field of Classification Search
None
See application file for complete search history.

(56) References Cited

U.S. PATENT DOCUMENTS

| | | | |
|---|---|---|---|
| 9,548,053 B1 * | 1/2017 | Basye | ..................... G10L 15/22 |
| 9,691,378 B1 | 6/2017 | Meyers et al. | |
| 9,728,188 B1 | 8/2017 | Rosen et al. | |

(Continued)

*Primary Examiner* — Brent Swarthout
(74) *Attorney, Agent, or Firm* — BakerHostetler

(57) ABSTRACT

A computing device may be configured to receive a content asset and to determine whether the content asset comprises one or more triggers. The trigger may be a word, phrase, or passcode that alerts a voice activated device to the presence of a voice command and may serve as an instruction to the voice activated device to cause execution of the voice command. In response to determining that the content asset comprises one or more triggers, the computing device may be configured to insert one or more signal markers into the content asset at a location corresponding to the one or more triggers, and to cause transmission and/or presentation of the content asset with the one or more signal markers. The signal markers may cause a voice activated device to ignore a voice command in the content asset, despite the presence of one or more triggers.

16 Claims, 7 Drawing Sheets

(56) References Cited

U.S. PATENT DOCUMENTS

| | | |
|---|---|---|
| 10,152,966 B1 * | 12/2018 | O'Malley .......... H04M 1/72484 |
| 10,186,265 B1 * | 1/2019 | Lockhart ................. G10L 15/32 |
| 2012/0213375 A1 | 8/2012 | Mahabub et al. |
| 2014/0350924 A1 | 11/2014 | Zurek et al. |
| 2015/0304785 A1 | 10/2015 | Gan et al. |
| 2017/0083285 A1 | 3/2017 | Meyers et al. |
| 2017/0103754 A1 | 4/2017 | Higbie et al. |
| 2017/0200451 A1 | 7/2017 | Bocklet et al. |
| 2018/0151180 A1 | 5/2018 | Yehuday |
| 2019/0043492 A1 * | 2/2019 | Lang ................ H04N 21/42203 |
| 2019/0346955 A1 | 11/2019 | Popovich et al. |

\* cited by examiner

PREVENTING UNWANTED ACTIVATION OF A DEVICE

CROSS-REFERENCE TO RELATED APPLICATIONS

This application is a continuation of U.S. patent application Ser. No. 16/182,126, filed Nov. 6, 2018, now U.S. Pat. No. 10,978,057, which is a continuation of U.S. patent application Ser. No. 15/798,625 filed Oct. 31, 2017, now U.S. Pat. No. 10,152,966 each of which is hereby incorporated by reference in their entirety.

BACKGROUND

Voice activated devices may be controlled using audio inputs such as vocal instructions or utterances from a user. A given voice activated device may be configured to receive an audio signal comprising a trigger and a voice command, and verification of the trigger may cause the voice activated device to output a response based on the received voice command. By removing the need to use buttons and other modes of selection, voice activated devices may be operated by a user such as a human operator in a hands-free manner, allowing the user to issue commands while performing other tasks. A voice activated device may be in communication with one or more other devices, such as a set-top box, allowing the user to turn on a television set or change a channel via a voice command without having to use a hand-operated remote control device. However, it may be possible that a voice activated device receives a trigger from an unintended source, such as during playback of a television commercial, causing the voice activated device to respond in an undesirable manner.

SUMMARY

Methods and systems are described for inserting one or more signal markers into a content asset in order to prevent false triggers at a voice activated device. A computing device may be configured to receive a content asset and to determine whether the content asset comprises one or more triggers. The trigger may be a word, phrase, or passcode that alerts a voice activated device to the presence of a voice command and may serve as an instruction to the voice activated device to cause execution of the voice command. For example, a trigger may comprise the utterance "remote control" and a voice command may comprise the utterance "tune to channel two." However, it may be possible that the trigger and corresponding voice command may be received from an unintended source, sush as during playback of a television commercial, causing the computing device to generate an instruction to the set-top box to tune to channel 2. In order to prevent such unwanted activation, the computing device may be configured to insert one or more signal markers into the content asset at a location corresponding to the one or more triggers, and to cause transmission of the content asset with the one or more signal markers. Detection of the signal markers by a voice activated device may cause the voice activated device to ignore a voice command in the content asset, despite the presence of one or more triggers.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Methods and systems are described herein for preventing false triggers at a user device such as a hands-free device or a voice activated device. A voice activated device may be configured to receive a trigger and a voice command spoken by a user of the device, and verification of the trigger may cause the voice activated device to output a response based on the received voice command. The voice activated device may also receive one or more triggers from an unintended source, such as a nearby television set that outputs an audio signal comprising the trigger and a voice command. Triggers received from unintended sources may be referred to herein as "false triggers." The false trigger may cause the voice activated device to operate in an unintended manner, for example, by executing or responding to the voice command received from the nearby television. In order to prevent the execution of voice commands associated with false triggers, one or more signal markers may be inserted into the audio signal at a location corresponding to the trigger and/or the voice command. Upon receiving an audio signal with the inserted signal markers, the voice activated device may be configured to ignore the trigger and/or the voice command, thereby preventing the occurrence of a false trigger.

Figure 1:
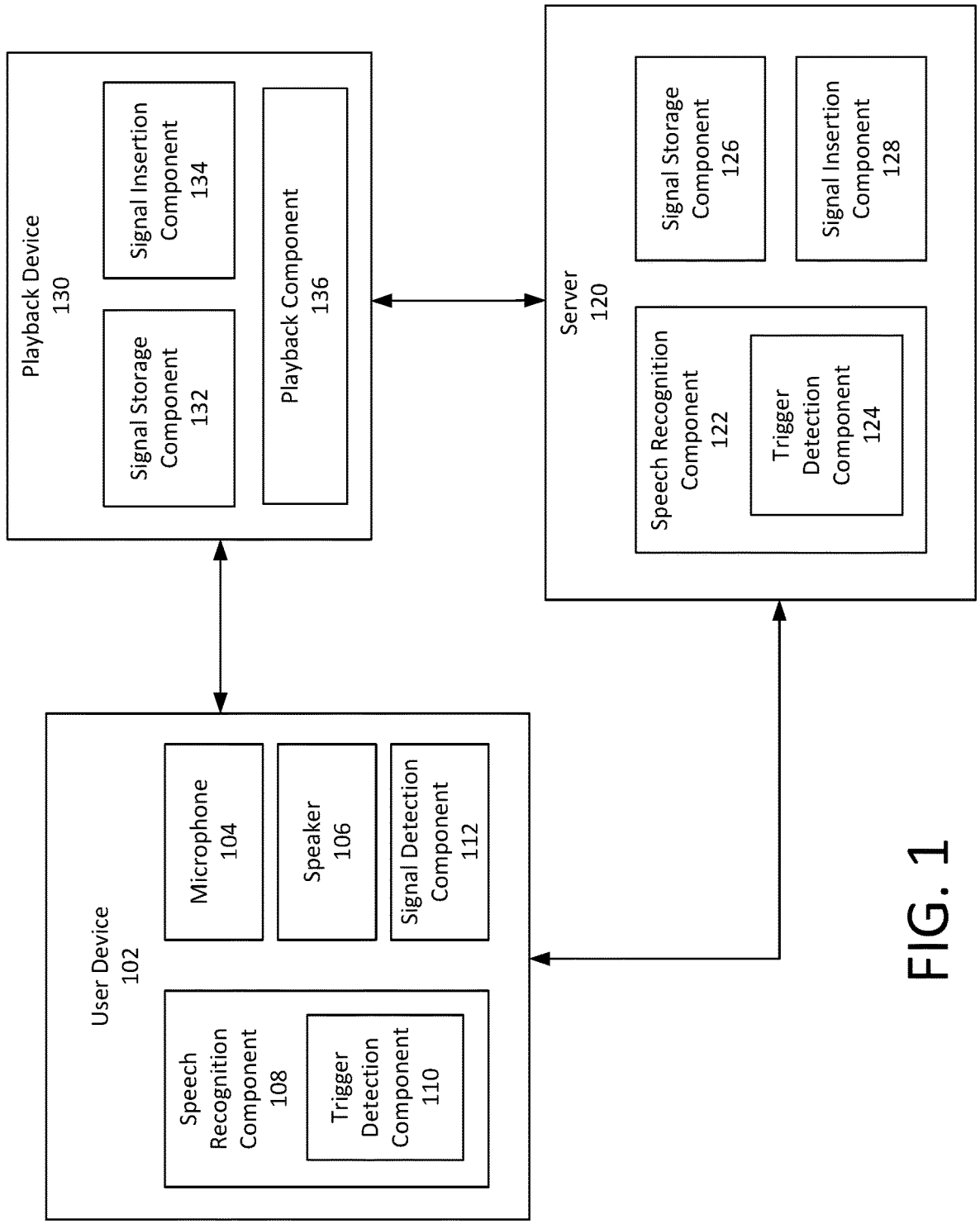
FIG. 1 is a block diagram of an example system.

An example system 100 for preventing false triggers is illustrated in FIG. 1. The user device 102 may be a hands-free device or a voice activated device, such as a voice activated remote control. The user device 102 may be configured to receive an audio input comprising a trigger and/or a voice command. The audio input may be received, for example, from a user of the device or from an unintended source, such as playback of a content asset by a television set. The trigger may be a predetermined word, phrase, or passcode that alerts the user device to the presence of a voice command following the trigger, and may serve as an instruction to the user device to cause execution of the voice command or of an operation associated with the voice command. The trigger may comprise a phrase such as "hey voice activated device" that serves to instruct the user device to execute a voice command following the trigger.

The user device 102 may comprise a microphone 104 and a speaker 106. The microphone 104 may be configured to receive one or more audio signals. A trigger and a voice command may be received by the user device 102 through the microphone 104 and may instruct the user device 102 to perform some operation associated with the voice command. In one example, the microphone 104 may receive a single audio signal comprising a trigger and a voice command. In another example, the microphone 104 may receive a first audio signal comprising a trigger and a second audio signal comprising a voice command, the second audio signal following the first audio signal. An audio signal may further comprise one or more signal markers, as discussed herein.

In the example that the user device 102 is a voice activated remote control, the voice command received through the microphone 104 may be an instruction for the voice activated remote control to tune the nearest set top box to a specific channel. Verification of the trigger may cause the user device to output a response based on the received voice command. In the example phrase "remote control, tune to channel 2" uttered by a user of the device, the trigger may comprise the phrase "remote control" and the voice command may comprise the command "tune to channel 2." Upon verification of the trigger, the voice activated remote control may instruct the nearest set-top box to tune to channel 2. In another example, a voice command may comprise a query to the user device 102, such as "what is the current temperature?" The user device 102, in response to verification of a trigger, may output, through the speaker 106, a response such as "the current temperature is 72 degrees."

The speech recognition component 108 may be configured to perform speech recognition processing in order to verify a detected trigger. The speech recognition component 108 may be configured to recognize one or more words spoken by a user of the device 102 in order to authenticate the user and to instruct the user device 102 to listen for a voice command following the verified trigger. In one example, the speech recognition component 108 may be a limited speech recognition component configured to perform simple pattern matching, as opposed to complex speech recognition such as language modeling and statistical analysis, in order to detect the occurrence of the trigger. However, it is understood that the speech recognition component 108 may be any type of speech recognition component.

The speech recognition component 108 may comprise a trigger detection component 110. The trigger detection component 110 may be configured to detect the occurrence of the trigger, such as a predetermined word, phrase or password spoken by a user of the device. In one example, the user device 102 may be an "always-on" device, and detection of the trigger may cause the user device 102 to execute a command following the trigger. Alternatively, the user device 102 may be configured to enter a "sleep" mode where the user device 102 performs limited functionality, and may "wake" upon detection of the trigger. However, any words or phrases not corresponding to the trigger may be ignored by the user device 102.

The signal detection component 112 may be configured to detect the presence of one or more signal markers in an audio signal received at the user device 102. The signal marker may be inserted into a content asset by one of the server 120 or the playback device 130 in response to a determination that the content asset contains a false trigger. Detection of the signal marker by the signal detection component 112 may cause the user device 102 to ignore a voice command received in an audio signal. The audio signal may correspond to playback of the content asset by the playback device 130. In one example, the signal marker may be a unique, randomly generated signal marker outside of an audible frequency range, such as a signal marker having a frequency greater than 20 kHz.

The computing device 120 may be configured to insert one or more signal markers into a content asset comprising one or more triggers. The computing device 120 may be, for example, a server configured to store one or more signal markers known to the user device 102 and to insert the one or more signal markers into a content asset. The server 120 may comprise a speech recognition component 122. The speech recognition component may comprise, for example, one or more of a speech capture module, a digital signal processor (DSP) module, a preprocessed signal storage module, and a reference speech pattern and pattern matching algorithm module. Speech recognition may be done in a variety of ways and at different levels of complexity, for example, using one or more of pattern matching, pattern and feature analysis, and language modeling and statistical analysis. However, it is understood that any type of speech recognition may be used, and the examples provided herein are not intended to limit the capabilities of the speech recognition component 122.

Pattern matching may comprise recognizing each word in its entirety and employing a pattern matching algorithm to match a limited number of words with stored reference speech patterns. An example implementation of pattern patching is a computerized switchboard. For example, a person who calls a bank may encounter an automated message instructing the user to say "one" for account balance, "two" for credit card information, or "three" to speak to a customer representative. In this example, the stored reference speech patterns may comprise multiple reference speech patterns for the words "one" "two" and "three." Thus, the computer analyzing the speech may not have to do any sentence parsing or any understanding of syntax. Instead, the entire chunk of sound may be compared to similar stored patterns in the memory.

Pattern and feature analysis may comprise breaking each word into bits and recognizing the bits from key features, for example, the vowels contained in the word. For example, pattern and feature analysis may comprise digitizing the sound using an analog to digital converter (A/D converter). The digital data may then be converted into a spectrogram, which is a graph showing how the component frequencies of the sound change in intensity over time. This may be done, for example, using a Fast Fourier Transform (FFT). The spectrogram may be broken into a plurality overlapping acoustic frames. These frames may be digitally processed in various ways and analyzed to find the components of speech they contain. The components may then be compared to a phonetic dictionary, such as one found in stored patterns in the memory.

Language modeling and statistical analysis is a more sophisticated speech recognition method in which knowledge of grammar and the probability of certain words or sounds following one from another is used to speed up recognition and improve accuracy. For example, complex voice recognition systems may comprise a vocabulary of over 50,000 words. Language models may be used to give context to words, for example, by analyzing the words proceeding and following the word in order to interpret different meanings the word may have. Language modeling and statistical analysis may be used to train a speech recognition system in order to improve recognition of words based on different pronunciations. While FIG. 1 depicts a speech recognition component 106 and a speech recognition component 122, it is understood that at least part of the speech recognition process necessary to execute the voice command may be performed by a remote server.

The speech recognition component 122 may comprise a trigger detection component 124. The trigger may be a predetermined word, phrase, or passcode in a content asset that, when received at a voice activated device, may cause the voice activated device to execute a voice command associated with the trigger. In one example, the speech recognition component 122 may be configured to generate a transcription of a content asset, and the trigger detection component 124 may be configured to determine whether the transcription contains any known triggers. In the example that the voice activated device is a voice activated remote control, the trigger may comprise the phrase "hey remote control." The voice activated remote control, in response to detection of the trigger, may execute a voice command associated with the trigger.

The signal storage component 126 may receive, from the trigger detection component 124, an indication that a content asset comprises one or more triggers. In response to receipt of this indication, the signal storage component 126 may be configured to generate one or more signal markers for insertion into the content asset. The signal markers may serve as an instruction to the user device 102 to ignore a voice command received in connection with a detected trigger. The signal markers may be sent to the user device 102 so that the signal markers may be recognized by the user device 102 as an instruction to ignore one or more triggers in a received audio signal. Additionally or alternatively, the user device 102 may store one or more signal markers known to the signal storage component 126.

The signal marker insertion component 128 may be configured to insert one or more signal markers into the content asset. In one example, the signal marker insertion component 128 may be configured to insert a signal marker at a location in the content asset corresponding to a trigger and/or a corresponding voice command. In another example, in response to receiving an indication of a trigger in the content asset, the signal marker insertion component 128 may be configured to insert a signal marker into the entire content asset or portions of the content asset that comprise a trigger. The content asset may be a thirty second advertisement that comprises a known trigger word followed by a voice command. The signal marker insertion component 128 may be configured to insert an inaudible signal marker (e.g., a signal marker having a frequency greater than 20 kHz) into the portion of the content asset that contains the trigger word or to insert the inaudible signal marker throughout the entire portion of the content asset.

The playback device 130 may receive, from the server 120, a content asset such as a television asset or an advertising asset. The content asset may be received with or without one or more signal markers inserted in the content asset corresponding to a location of one or more triggers in the content asset. The playback device 130 may be configured to insert one or more signal markers into the content asset corresponding to a location of one or more triggers in the content asset such that the user device 102 may ignore the one or more triggers when the content asset is played back by the playback device 130. In one example, the signal storage component may receive, from the server 120, a transcription of a content asset, and may determine that the transcription of the content asset contains one or more known triggers.

The signal storage component 132 may be configured to receive an indication that a trigger has been detected at a location in a content asset. Additionally or alternatively, the signal storage component may receive the transcription of the content asset and may determine a location of one or more signal markers in the content asset. The signal storage component 132 may be configured to generate one or more signal markers for insertion into the content asset. The signal storage component 132 may send the one or more signal markers to the user device 102. The signal markers may serve as an instruction to the user device 102 to ignore a voice command received in connection with a detected trigger.

The signal insertion component 134 may be configured to insert one or more signal markers into the content asset. In one example, the signal insertion component 134 may be configured to insert a signal marker at a location in the content asset corresponding to a trigger and/or a corresponding voice command. In another example, in response to receiving an indication of a trigger in the content asset, the signal marker insertion component 134 may be configured to insert a signal marker into the entire content asset or portions of the content asset that comprise a trigger.

Figure 2:
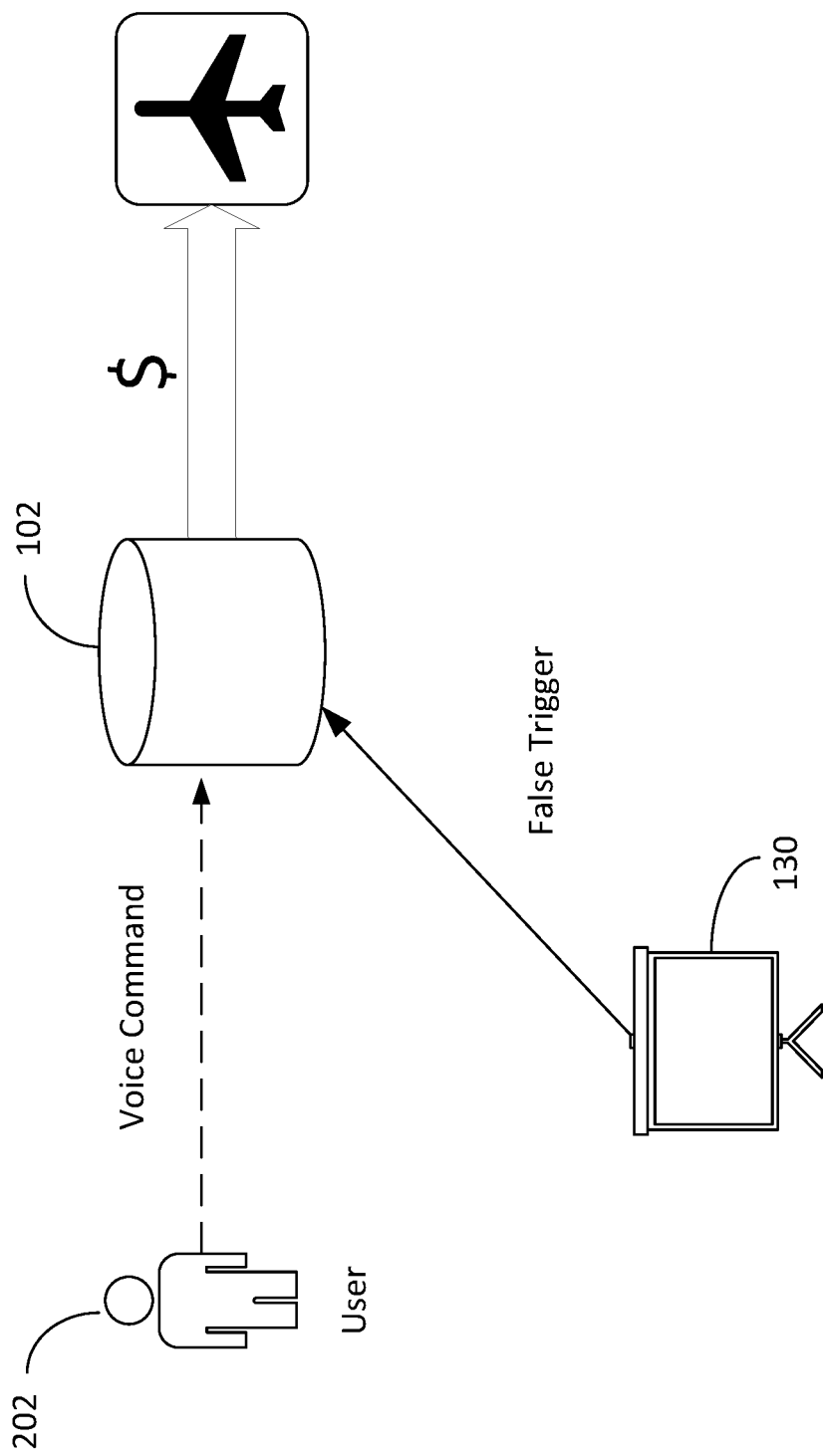
FIG. 2 is an example of a false trigger event.

FIG. 2 illustrates an example false trigger scenario caused by playback of a content asset comprising one or more false triggers and associated voice commands. Voice activated device 102 may be configured to receive an audio signal comprising a trigger and a voice command, and verification of the trigger may cause the voice activated device to output a response based on the received voice command. The voice activated device may be in communication with a third party server, such as a third party flight reservation service. In response to receipt of a trigger word or phrase (e.g., "hey voice activated device") followed by a voice command (e.g., "book me a flight to New York City"), the voice activated device may be configured to contact the third party flight reservation service to book the user a flight to New York City. In this scenario, at least one of the voice activated device or the third party flight reservation service may have stored payment information associated with the user, such as the user's credit card information.

As further shown in FIG. 2, a playback device such as a set-top box connected to a television set may be within an audible range of the voice activated device. The television set may be configured to playback a content asset, such as an advertisement, television show or movie received at or stored by the set-top box. The content asset being played back by the television set may comprise a trigger and a voice command. For example, the content asset may be an advertisement for a third party flight reservation service, and may comprise an audio signal with the phrase "hey voice activated device, book me a flight to New York City." The voice activated device may receive this audio signal from the television set, verify the presence of the trigger and the corresponding voice command, and may book a flight to New York City for the user 202. The voice activated device may have no way of knowing that the trigger and subsequent voice command was received from a person or device that is not the user 202. This is known as a false trigger, and may present a number of problems in the application of hands free or voice activated devices. Thus, it may be desirable to prevent the occurrence of false triggers, for example, by inserting one or more signal markers into the content asset that cause the user device to ignore such triggers.

Figure 3:
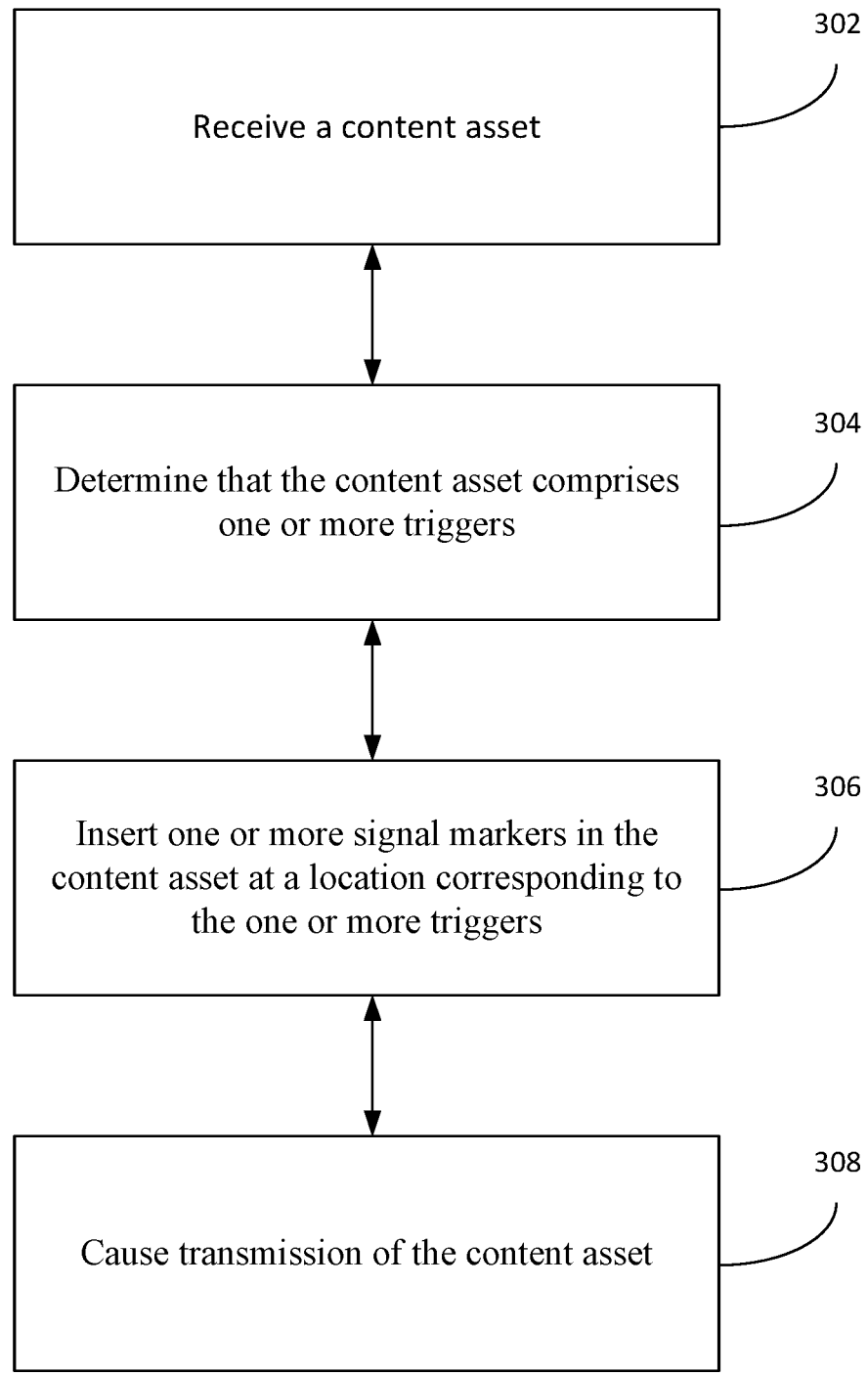
FIG. 3 is a flow chart of an example method in accordance with an aspect of the disclosure.

FIG. 3 illustrates an example method in accordance with an aspect of the disclosure. At step 302, a content asset may be received. The content asset may be received, for example, by the server 120 illustrated in FIG. 1. The content asset may be a movie asset, a television asset, a live broadcast asset such as a sporting event, an audio asset such as music streaming, a Video on Demand (VOD) asset, or an advertising asset such as a commercial break in a television asset. However, it is understood that the content asset may be any type of content asset having any length or duration. The content asset may be received from a service provider, such as a service provider configured to distribute movie and television assets to one or more subscribers of the service provider.

At step 304, it may be determined that the content asset comprises one or more triggers. A trigger may be a predetermined word, phrase, or passcode that, when received at a user device (e.g., a voice activated device), alerts the user device to the presence of a voice command following the trigger, and may serve as an instruction to the user device to execute the voice command. In one example, the user device may be a voice activated device that is in communication with a third party server, such as a third party flight reservation service. In response to receipt of a trigger word or phrase (e.g., "hey voice activated device") followed by a voice command (e.g., "book me a flight to New York City"), the voice activated device may be configured to contact the third party flight reservation service to book a flight to New York City for the user associated with the voice activated device.

The trigger may be detected by the trigger detection component 124 associated with speech recognition component 122. The speech recognition component 122 may be a limited speech recognition component configured to perform simple pattern matching in order to detect the occurrence of one or more predetermined triggers. Additionally or alternatively, the speech recognition component may comprise functionality to perform additional speech recognition processing such as pattern matching, pattern and feature analysis, and language modeling and statistical analysis. However, it is understood that any type of speech recognition processing may be used in order to detect the occurrence of a trigger. Using speech recognition processing, the server 120 may be configured to generate a transcription of the content asset in order to detect the presence of one or more triggers. In one example, the content asset may be received with one or more pointers indicating the presence of a trigger in the content asset.

At step 306, one or more signal markers may be inserted in the content asset. The signal markers may cause a voice activated device, in response to detection of the signal markers, to ignore one or more triggers in an audio signal and thereby to not cause execution of a voice command associated with the trigger. The signal marker may be an inaudible signal marker inserted at a location corresponding to the one or more triggers in the content asset. Thus, the voice activated device may simultaneously receive the signal marker and the trigger, causing the voice activated device to ignore the trigger. The signal marker may be inserted simultaneously with the trigger, immediately before the trigger, immediately following the trigger, or at any location in the content asset that may cause the voice activated device not to cause execution of the voice command following the trigger. The signal marker may be inserted during the entire length of the content asset. For example, if the content asset is a thirty second advertising asset comprising a trigger word, an inaudible signal marker (e.g., a signal marker having a frequency greater than 20 kHz) may be played throughout the entire thirty second content asset. Since the signal marker is inaudible, it may be undetectable by a user of the voice activated device but within a detectable range of the voice activated device itself.

The one or more signal markers may be inserted into the content asset at the time of recording the content asset. The content asset may be a television asset being produced on set or in a recording studio. In one example, one or more signal markers may be generated contemporaneously with the utterance of one or more known trigger words in the content asset. The triggers may be one or more words read from a script, and the signal markers may be generated at a time that the triggers are being read from the script. In another example, there may be a delay (e.g., five seconds) between the time the content asset is filmed and the time the content asset is saved to a storage device in the studio. An operator or voice recognition software may insert the one or more signal markers at the location of the trigger after the television show is filmed but before the content asset is saved to a storage device.

The one or more signal markers may be inserted into the content asset at a time of transcoding the content asset. Transcoding the content asset may comprise converting the content asset, for example, from one video format to another video format, such as one amenable to the means by which the content distributor's users view the content. In one example, the content asset may be transcoded from a quadrature amplitude modulation (QAM) format to an Internet Protocol (IP) video format. However, it is understood that the content asset may be converted between any types of format, including H.264, MPEG-4 Part 2, or MPEG-2 formats. During transcoding of the content asset, speech recognition processing may be performed on the content asset in order to determine the location of one or more triggers in the content asset. For example, the speech recognition component may be configured to perform any of simple pattern matching, pattern and feature analysis, and language modeling and statistical analysis in order to determine the location of one or more triggers in the content asset. Additionally or alternatively, the content asset may comprise one or more pointers indicating the presence of one or more triggers in the content asset. One or more signal markers may be inserted at the determined locations of the one or more triggers in the content asset before, during or after the transcoding of the content asset from one format to another.

The one or more signal markers may be inserted into the content asset at a time after the content asset has been made available for playback. The playback device 130 may be configured to store one or more content assets on a storage device associated with the playback device. For example, the playback device may be a set-top box configured to store one or more recorded content assets on a digital video recording (DVR) device. In one example, the playback device may receive, from a server, a transcription of a content asset, and may insert the one or more signal markers into the content asset at a location corresponding to one or more detected triggers based on this transcription. Additionally or alternatively, the playback device may be configured to perform speech recognition processing on the stored content asset in order to determine the location of one or more triggers in the content asset. In one example, the playback device may be configured to insert one or more signal markers throughout the entire duration of the content asset. Since the signal markers may be inaudible to a user of the playback device, the user device may ignore the trigger and subsequent voice command without the knowledge of the user. The playback device may be configured to receive an indication that a content asset stored on the playback device comprises one or more triggers, and may instruct the playback device to insert one or more signal markers at the location of the one or more triggers.

Figure 4:
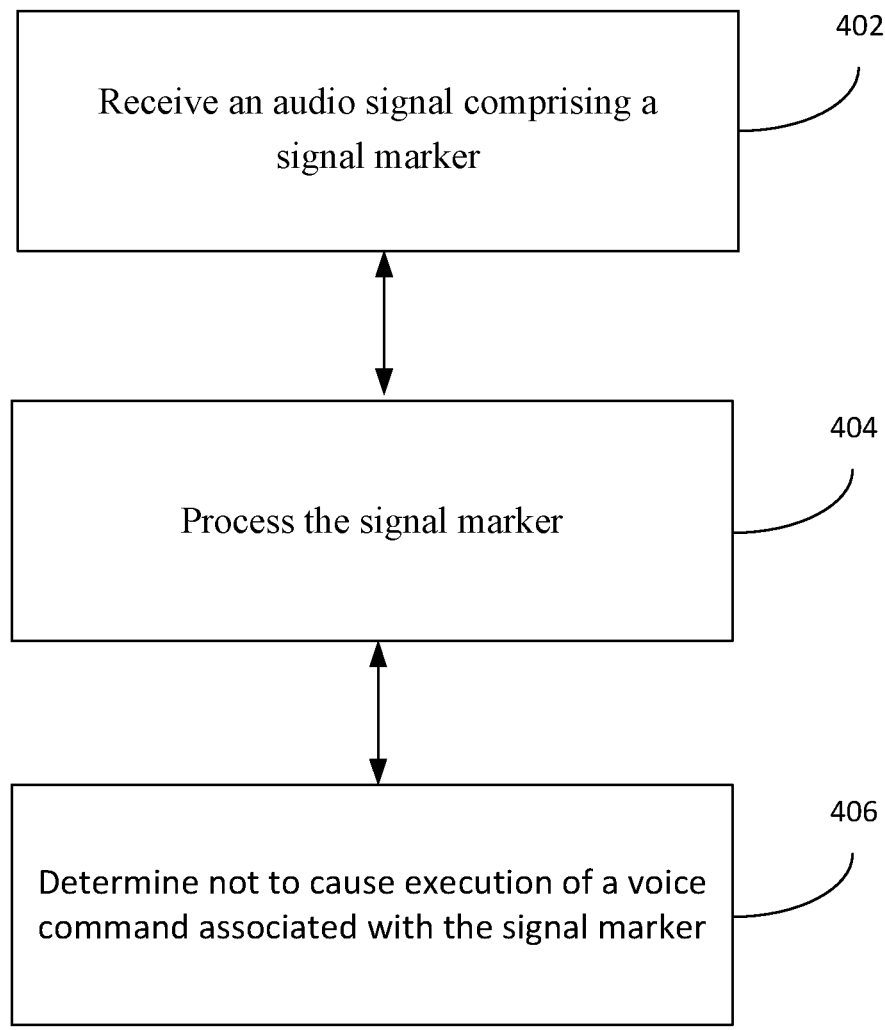
FIG. 4 is a flow chart of an example method in accordance with an aspect of the disclosure.

FIG. 4 illustrates an example method in accordance with an aspect of the disclosure. At step 402, an audio signal may be received. The audio signal may be received, for example, from the playback device 130 during playback of a content asset. The audio signal may comprise one or more signal markers. The audio signal may be received, for example, by the user device 102 illustrated in FIG. 1. The signal marker may be an inaudible signal marker (e.g., a signal marker having a frequency greater than 20 kHz) inserted at a location corresponding to the one or more triggers in the audio signal. Since the signal marker is inaudible, it may be undetectable by a user of the user device but within a detectable range of the user device itself.

The user device 102 may comprise a microphone, such as the microphone 102 illustrated in FIG. 1. In one example, the user device may comprise a plurality of microphones. At least one of the microphones may be configured for the detection of one or more triggers and/or one or more voice commands in the audio signal, and at least one of microphones may be configured for detection of one or more signal markers in the audio signal. The at least one microphone configured for detection of the signal markers may be configured to detect signal markers in the audio signal having a frequency greater or less than a given threshold. For example, the microphones configured for detection of the signal markers may be configured to detect a signal marker having a frequency greater than 20,000 Hz. Thus, the microphone may detect the presence of a signal marker in the audio signal based on the frequency of the signal marker.

In one example, it may be determined that the audio signal comprises a trigger and a voice command, the trigger instructing the device to cause execution of the voice command. A trigger may be a predetermined word, phrase, or passcode that, when received at the user device 102, alerts the user device 102 to the presence of a voice command following the trigger, and may serve as an instruction to the user device 102 to cause execution of an operation associated with the voice command following the trigger. In one example, the user device 102 may be a voice activated device that is in communication with a third party server, such as a third party flight reservation service. In response to receipt of a trigger word or phrase (e.g., "hey voice activated device") followed by a voice command (e.g., "book me a flight to New York City"), the voice activated device may be configured to contact the third party flight reservation service to book the user associated with the voice activated device a flight to New York City.

The trigger may be detected by the trigger detection component 110 associated with speech recognition component 108. The speech recognition component 108 may be a limited speech recognition component configured to perform simple pattern matching in order to detect the occurrence of one or more triggers in the content asset. However, the speech recognition component may comprise functionality to perform additional speech recognition processing such as pattern matching, pattern and feature analysis, language modeling and statistical analysis.

At step 404, the signal marker may be processed. Processing the signal marker may comprise determining that the signal marker is an instruction to ignore one or more triggers in the audio signal. Processing the signal marker may comprise comparing the signal marker to a plurality of stored signal markers. The user device may be configured to store one or more signal markers that may be generated by one of the server 120 or the playback device 130. The server 120 or the playback device 130 may be configured to insert the one or more signal markers known to the user device into a content asset in order to instruct the user device to ignore a trigger and corresponding voice command when the content asset is played back by the playback device. In one example, different signal markers may be used to instruct the user device to perform different commands. A signal marker having a frequency of 30,000 Hz may instruct the user device to ignore any triggers in the audio signal for the next five seconds, while a signal marker having a frequency of 40,000 Hz may instruct the user device to ignore any triggers in the audio signal for the next twenty seconds. Processing of the audio signal may be enabled or disabled by a user of the user device 102. For example, a user of the device may determine that he does not want the user device to ignore any known triggers regardless of their source, and thus may disable processing of the known signal markers. Disabling processing of the signal markers may result in the user device executing a voice command received from any source, including those associated with false triggers.

At step 406, it may be determined, based on the processing of the signal marker, not to cause execution of an operation associated with the voice command. In the example that the audio signal comprises the trigger "hey voice activated device" and the voice command "book me a flight to New York City," the user device may be configured to cause execution of the voice command by booking a flight to New York City for the user associated with the device. However, in response to detection of a known signal marker in the audio signal by the user device, the user device may be configured to ignore the voice command following the trigger and may not book any flights. The user device may send, to a server such as the server 120, an indication that the voice command has not been executed.

The audio signal may be sampled at periodic intervals. The user device may be configured to sample the audio signal, for example, every 10 milliseconds or at any periodic interval in order to detect the presence of an audio signal. The user device may be configured to determine, based on the sampling of the audio signal, a location of the source that generated the audio signal. For example, the user device may determine, based on a sampling of a received audio signal, a location of a television set at a location proximate to the user device (e.g., in the same room as the user device). The user device may determine, based on a decibel level or a frequency of the audio signal, that this audio signal is being received from a television set. Thus, if a trigger is received from a location that the user device has determined to be a location of a television set, the user device may be configured to ignore the voice command following the trigger. In contrast, if the trigger is received from a location that is different than the location of the known television set, the user device may be configured to execute the voice command following the trigger.

Figure 5:
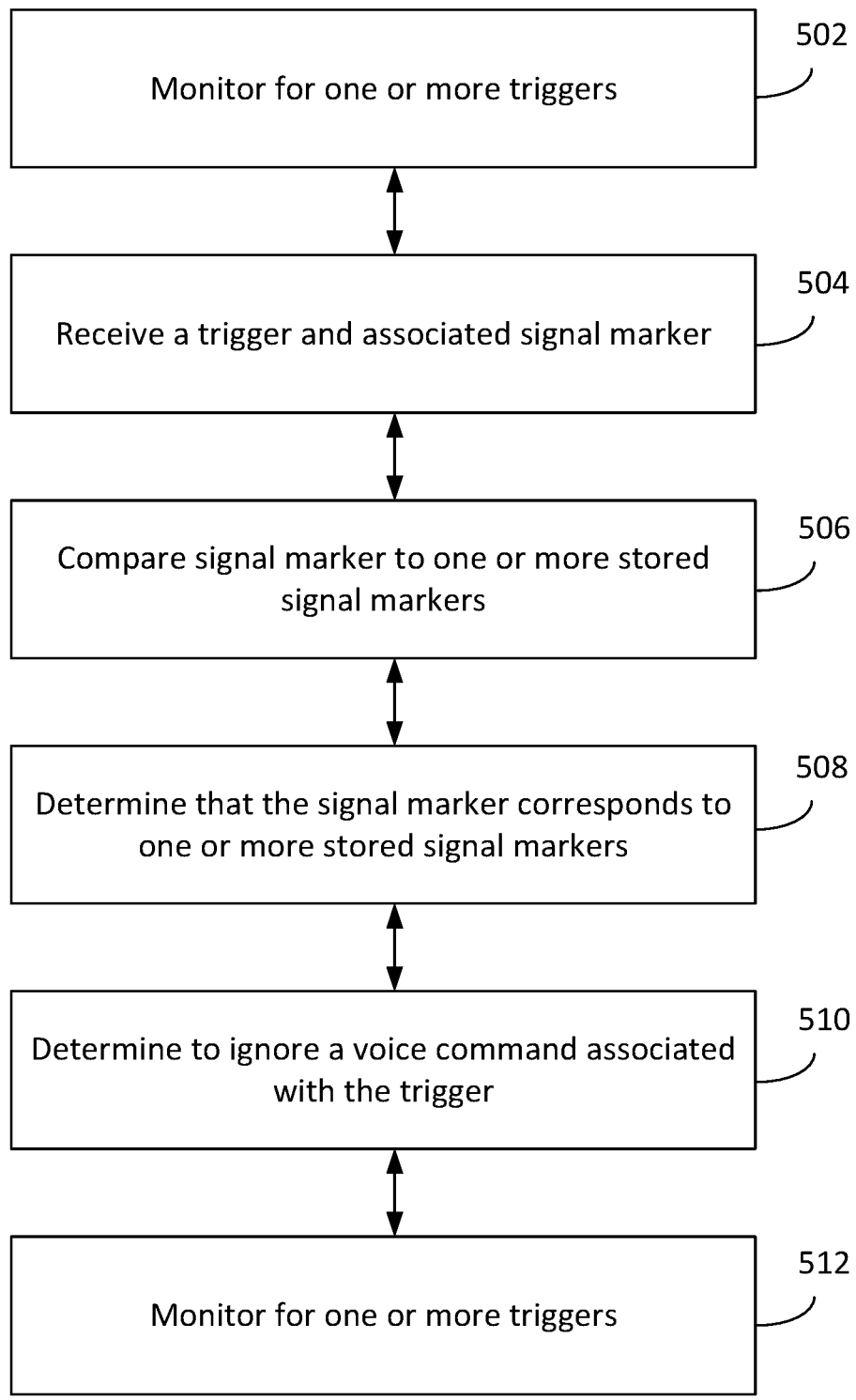
FIG. 5 is a flow chart of an example method in accordance with an aspect of the disclosure.

FIG. 5 illustrates an example method in accordance with an aspaect of the disclosure. At step 502, a user device such as a voice activated device may monitor for one or more triggers. The trigger may be a predetermined word, phrase, or passcode that, when received at a user device (e.g., a voice activated device), alerts the user device to the presence of a voice command following the trigger, and may serve as an instruction to the user device to execute the voice command. An example trigger may comprise the utterance "voice remote."

At step 504, the voice activated device may receive a trigger and an associated signal marker. The signal marker may be an inaudible signal marker (e.g., a signal marker having a frequency greater than 20 kHz) inserted at a location corresponding to the one or more triggers in the audio signal. Since the signal marker is inaudible, it may be undetectable by a user of the user device but within a detectable range of the user device itself.

At step 506, the signal marker may be compared to one or more stored signal markers. The one or more stored signal markers may be stored, for example, in the signal storage component 126 associated with the server 120 shown in FIG. 1 Additionally or alternatively, the one or more stored signals may be stored in a memory of the voice activated device. Comparing the received signal marker to one or more stored signal markers may comprise comparing a frequency or duration of the received signal marker to a frequency or duration of the one or more stored signal markers.

At step 508, it may be determined that the received signal marker corresponds to one or more of the stored signal markers. In one example, the voice activated device may send the received signal marker to the server. The server may be configured to compare the received signal marker to one or more of the stored signal markers in the signal marker storage component and to determine that the received signal marker corresponds to one or more of the stored signal markers. In response to this determination, the server may send to the voice activated device an indication that the received signal marker corresponds to one or more of the stored signal markers. Additionally or alternatively, the voice activated device may be configured to compare the received signal marker to one or more signal markers stored in the memory of the voice activated device and determine that the received signal marker corresponds to one or more of those stored signal markers. Determining that the received signal marker corresponds to one or more of the stored signal markers may comprise determining that a frequency or duration of the received signal marker corresponds to a frequency or duration of one or more of the stored signal markers.

At step 510, it may be determined that a voice command associated with the trigger should be ignored. For example, a voice command "tune to channel 2" may follow the received trigger (e.g., "voice remote"). The voice activated device, in response to receiving the voice command following the trigger, may normally be configured to output a response based on the voice command such as by generating an instruction to a nearby set-top box to tune to channel 2. However, in response to determining that the signal marker associated with the trigger corresponds to one or more stored signal markers, the voice activated device may be configured to ignore the voice command following the trigger.

At step 512, the voice activated device may be configured to monitor for one or more other triggers. As discussed herein, if the voice activated device detects one or more valid triggers and an associated voice command, the voice activated device may be configured to cause execution of the voice command following the trigger. However, if the voice activated device receives a signal marker associated with the trigger that corresponds to one or more stored signal markers, the voice activated device may be configured to ignore the voice command following the trigger.

Figure 6:
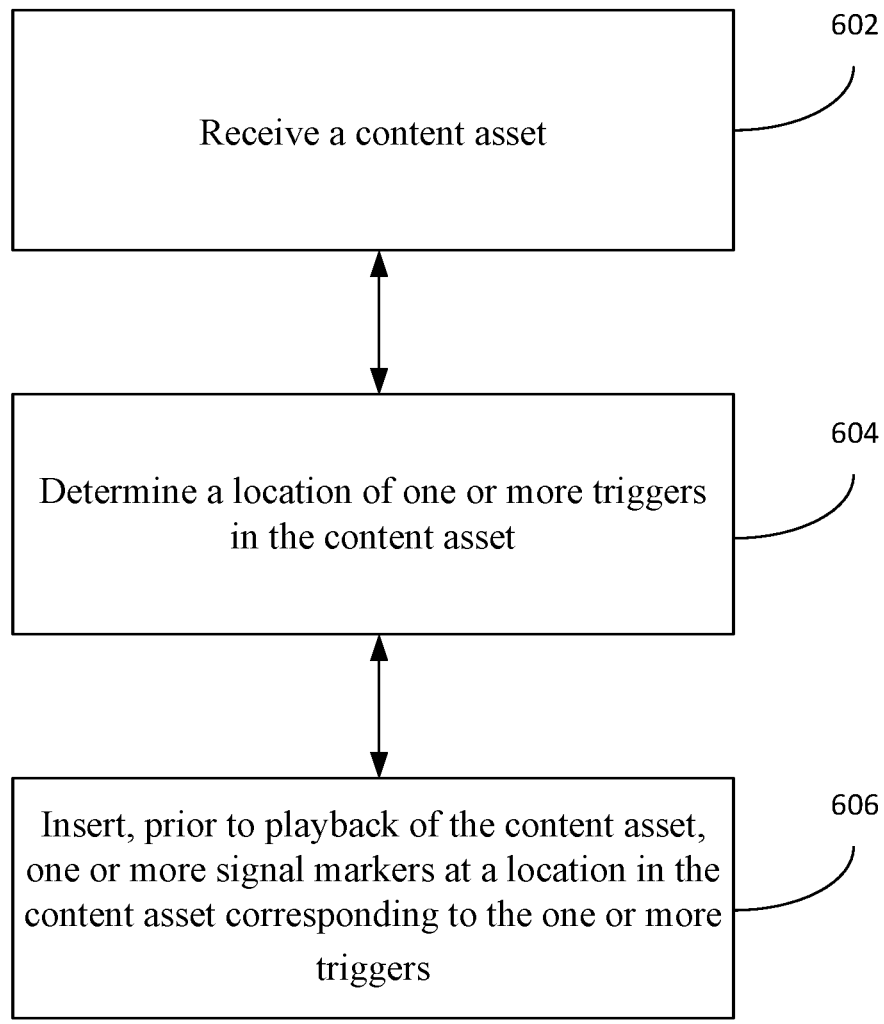
FIG. 6 is a flow chart of an example method in accordance with an aspect of the disclosure.

FIG. 6 illustrates an example method in accordance with an aspect of the disclosure. At step 602, a content asset may be received. The content asset may be received, for example, by the playback device 130 illustrated in FIG. 1. In one example, the playback device 130 may be a set-top box. The content asset may be a movie asset, a television asset, a live broadcast asset such as a sporting event, an audio asset such as music streaming, a Video on Demand (VOD) asset, or an advertising asset such as a commercial break in a television asset. However, it is understood that the content asset may be any type of content asset having any length or duration. The content asset may be received from a service provider, such as a service provider configured to distribute movie and television assets to one or more subscribers of the service provider.

At step 604, a location of one or more triggers in the content asset may be determined. The trigger may be a predetermined word, phrase, or passcode that, when received at a voice activated device, alerts the voice activated device to the presence of a voice command following the trigger, and may serve as an instruction to the voice activated device not to cause execution of an operation associated with the voice command following the trigger. The playback device may receive, from the server 120, a transcription of a content asset, and may determine, based on this transcription, a location of one or more triggers in the content asset. Additionally or alternatively, the playback device may receive, from the server, an indication of a location of one or more triggers in the content asset. The playback device may determine, based on this received information, that a thirty second advertising asset comprises a trigger eighteen seconds into the content asset, such as "hey voice activated device."

At step 606, prior to playback of the content asset, one or more signal markers may be inserted at a location in the content asset corresponding to the one or more triggers. The signal marker may be an inaudible signal marker inserted at a location corresponding to the one or more triggers in the content asset. Thus, in response to playback of the content asset after insertion of the signal marker, a voice activated device may receive an audio signal comprising a trigger and a corresponding signal marker. The voice activated device, in response to receiving the signal marker simultaneously with the trigger, may decide not to cause execution of a voice command following the trigger. The signal marker may be inserted simultaneously with the trigger, immediately before the trigger, immediately following the trigger, or at any location in the content asset that may cause the user device not to cause execution of the voice command following the trigger. The signal marker may be inserted during the entire length of the content asset. For example, if the content asset is a thirty second advertising asset comprising a trigger word, the signal marker may be played at an inaudible frequency throughout the entire thirty second content asset. Since the signal marker is inaudible (e.g., having a frequency greater than 20 kHz), it may be undetectable by a user of the voice activated device but within a detectable range of the voice activated device.

The playback device may receive, from the server 120, an instruction to insert the one or more signal markers at a location of the one or more triggers. For example, the server may send, to the playback device, an indication that a thirty minute advertising asset contains a trigger eighteen minutes into the advertisement. The server may send, to the playback device, an instruction to insert a signal marker of a given frequency at the location of the trigger. The signal marker, upon being received by a voice activated device in connection with a trigger, may cause the playback device not to cause execution of an operation associated with the voice command following the trigger.

Figure 7:
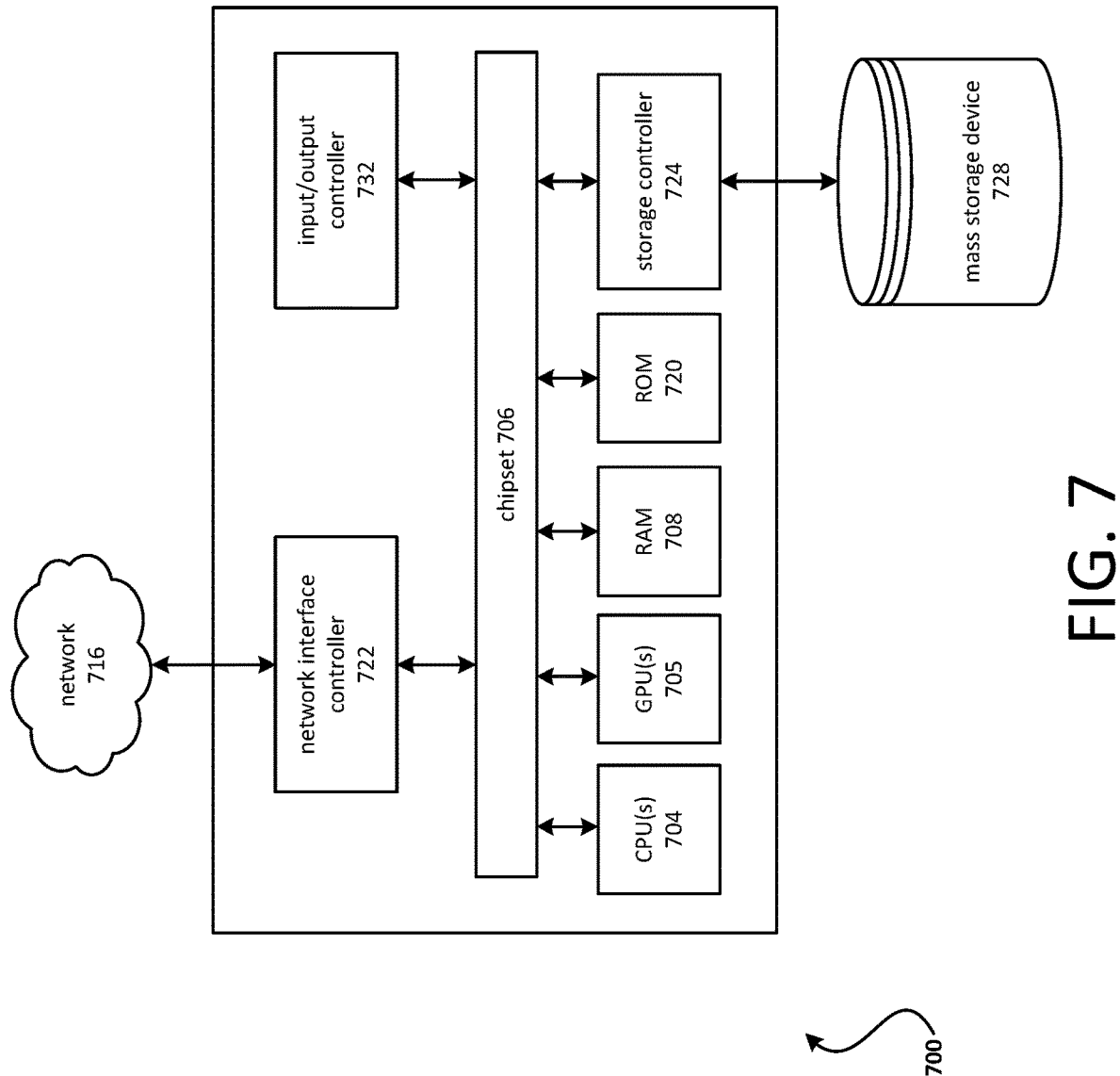
FIG. 7 is a block diagram of an example computing device.

FIG. 7 depicts a computing device that may be used in various aspects, such as the servers, modules, and/or devices depicted in FIGS. 1 and 2. With regard to the example architecture of FIG. 1, the user device 102, server 120, and/or the playback device 130 may each be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 3-6.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the mass storage device 728 by detecting the physical states or characteristics of one or more particular locations within the physical storage units.

In addition to the mass storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 3-6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state.

The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure.

The invention claimed is:

1. A method comprising:
receiving an audio signal comprising a trigger and an inaudible signal marker;
determining, based on comparing the inaudible signal marker to one or more reference signal markers, wherein the one or more reference signal markers comprises a first signal marker that indicates to ignore the trigger for a first time duration and a second signal marker that indicates to ignore the trigger for a second time duration that is different from the first time duration, that the inaudible signal marker indicates to ignore the trigger for the first time duration; and
determining, based on determining that the inaudible signal marker indicates to ignore the trigger for the first time duration, not to cause execution of words associated with the trigger.

2. The method of claim 1, further comprising receiving the words associated with the trigger.

3. The method of claim 2, wherein the words associated with the trigger comprise words received following the trigger.

4. The method of claim 1, wherein the words associated with the trigger comprise at least one of a command associated with the trigger or a query associated with the trigger.

5. The method of claim 1, wherein the trigger comprises a predetermined word, phrase, or passcode that indicates a presence of words associated with the trigger.

6. The method of claim 1, wherein comparing the inaudible signal marker to the one or more reference signal markers comprises comparing at least one of a frequency or a duration of the inaudible signal marker to at least one of a frequency or a duration of each of the one or more reference signal markers.

7. The method of claim 1, wherein the inaudible signal marker indicates not cause execution of the words associated with the trigger for a predetermined time duration.

8. The method of claim 1, wherein receiving the audio signal comprises receiving, at a voice activated device, the audio signal.

9. The method of claim 1, further comprising sending an indication that the words associated with the trigger were not executed.

10. A voice activated device comprising:
a microphone configured to receive an audio signal comprising a trigger and an inaudible signal marker; and
a computing device configured to:
determine, based on comparing the inaudible signal marker to one or more reference signal markers, wherein the one or more reference signal markers comprises a first signal marker that indicates to ignore the trigger for a first time duration and a second signal marker that indicates to ignore the trigger for a second time duration that is different from the first time duration, that the inaudible signal marker indicates to ignore the trigger for the first time duration; and
determine, based on determining that the inaudible signal marker indicates to ignore the trigger for the first time duration, not to cause execution of words associated with the trigger.

11. The device of claim 10, wherein the words associated with the trigger comprise at least one of a command associated with the trigger or a query associated with the trigger.

12. The device of claim 10, wherein the inaudible signal marker indicates not cause execution of the words associated with the trigger for a predetermined time duration.

13. The device of claim 10, further comprising a plurality of microphones, wherein the microphone is one of the plurality of microphones, and wherein the microphone is configured to detect the inaudible signal marker.

14. The device of claim 10, wherein the microphone is configured to detect a predetermined frequency associated with a frequency of the inaudible signal marker.

15. A method comprising:
- receiving an audio signal comprising a trigger;
- determining a location of the trigger in the audio signal;
- determining, based on a time duration associated with the trigger, a first inaudible signal marker, of a plurality of inaudible signal markers, wherein the first inaudible signal marker indicates to ignore the trigger for the time duration, and wherein a second signal marker of the plurality of inaudible signal markers indicates to ignore the trigger for a different time duration; and
- inserting the first inaudible signal marker at a location in the audio signal adjacent the location of the trigger in the audio signal.

16. The method of claim 15, wherein inserting the first inaudible signal marker at the location in the audio signal comprises inserting the first inaudible signal marker at the location in the audio signal at a time of recording the audio signal, at a time of transcoding the audio signal, or after the audio signal is available for output.

\* \* \* \* \*